(12) United States Patent
Iyer et al.

(10) Patent No.: US 8,031,764 B2
(45) Date of Patent: Oct. 4, 2011

(54) MULTIPLEXER BASED TRANSMITTER EQUALIZATION

(75) Inventors: Sitaraman V. Iyer, Santa Clara, CA (US); Henry Guo, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 12/059,755

(22) Filed: Mar. 31, 2008

(65) Prior Publication Data

US 2009/0245343 A1    Oct. 1, 2009

(51) Int. Cl.
*H03H 7/30* (2006.01)
*H03H 7/40* (2006.01)
*H03K 7/00* (2006.01)

(52) U.S. Cl. .................. 375/232; 375/229; 375/230
(58) Field of Classification Search ............ 375/232
See application file for complete search history.

(56) References Cited

U.S. PATENT DOCUMENTS

| | | | | |
|---|---|---|---|---|
| 5,159,337 A | * | 10/1992 | Lankreijer | 341/67 |
| 2007/0071083 A1 | * | 3/2007 | Canagasaby et al. | 375/229 |
| 2008/0075201 A1 | * | 3/2008 | Limberg | 375/321 |
| 2008/0212607 A1 | * | 9/2008 | Batty et al. | 370/464 |

* cited by examiner

*Primary Examiner* — Dac Ha
*Assistant Examiner* — Erin File
(74) *Attorney, Agent, or Firm* — Ryder, Lu, Mazzeo and Konieczny, LLC; Douglas J. Ryder

(57) ABSTRACT

In general, in one aspect, the disclosure describes a digital signal equalizer that includes a plurality of multiplexers. The number of multiplexers defines resolution of equalization. The plurality of multiplexers are configured in groups. The number of groups is based on number of taps, and the number of multiplexers associated with a particular group is based on equalization range for the group. The multiplexers in each group select a digital value associated with the cursor or a non-cursor tap associated with the group.

18 Claims, 5 Drawing Sheets

| Data Pattern (D-1, D0, D1, D2) | DAC Output |
|---|---|
| 0000 | .393 |
| 0001 | .328 |
| 0010 | .131 |
| 0011 | .066 |
| 1000 | .328 |
| 1001 | .262 |
| 1010 | .066 |
| 1011 | 0 |
| 0100 | 1 |
| 0101 | .934 |
| 0110 | .738 |
| 0111 | .672 |
| 1100 | .934 |
| 1101 | .869 |
| 1110 | .672 |
| 1111 | .607 |

*FIG. 2B*

MULTIPLEXER BASED TRANSMITTER EQUALIZATION

BACKGROUND

Lossy interconnect channels used in wireline communications, such as that between processor and chipsets on a computing platform, attenuate higher frequency components of the data signal and result in degraded link performance. Transmitter equalization improves the worst case receiver eye height by monitoring the data transmitted and to be transmitted and modifying the present data eye height at the transmitter. Typically, an equalizer is used to either boost high frequency gain or reduce low frequency gain in the signal waveform to compensate for the channel response. Transmitter side digital linear equalization may use Multiply-Add-Accumulate (MAC)/Arithmetic Logic Units (ALU) to perform computations used to provide the equalization. Some of the computations performed may be redundant so the equalizers may be power inefficient as a result.

BRIEF DESCRIPTION OF THE DRAWINGS

The features and advantages of the various embodiments will become apparent from the following detailed description in which:

FIG. 2B illustrates example results for various data patterns for an implementation of the equalizer of FIG. 2A, according to one embodiment;

DETAILED DESCRIPTION

Figure 1:
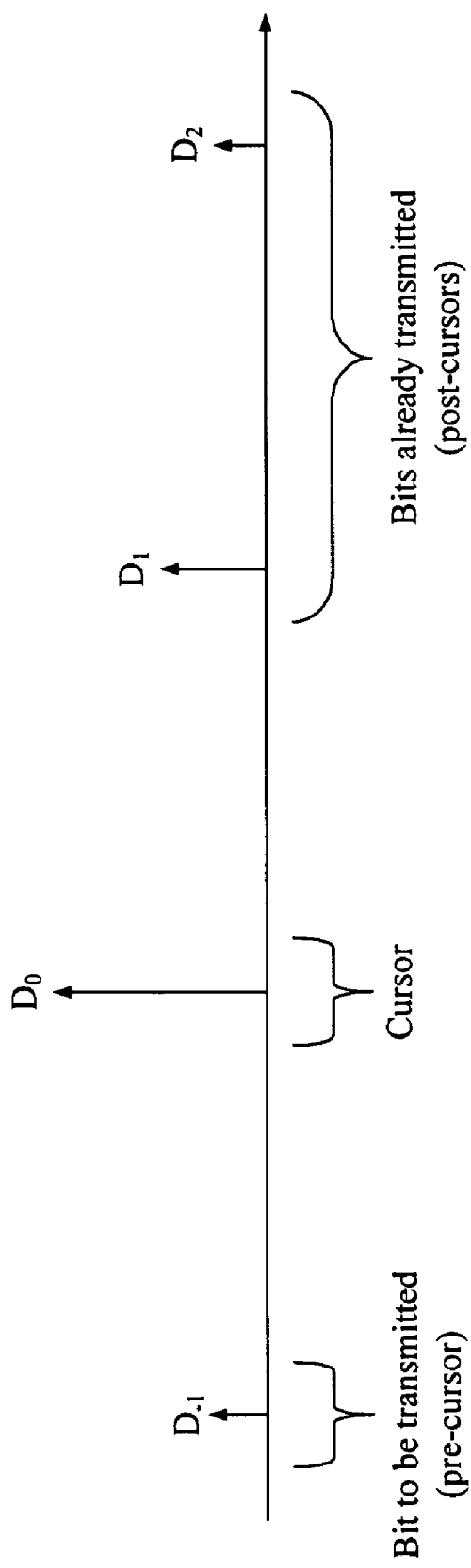
FIG. 1 illustrates a sequence of outputs from a serial link, according to one embodiment.

FIG. 1 illustrates a sequence of outputs (data stream) from a serial link. The current bit ($D_0$) being transmitted over the serial link is commonly referred to as the "cursor". Bits previously transmitted ($D_1$, $D_2$) are referred to as "post-cursors" and bits to be transmitted ($D_{-1}$) are referred to as "pre-cursors". In order to provide digital linear equalization of the data being transmitted an equalizer may look at some combination of post-cursor(s) and pre-cursor(s) in addition to the cursor. The number of data bits used as part of the digital linear equalization is known as taps (four taps are illustrated). Each tap may contribute to the digital linear equalization of a data stream. The post cursors may contribute more to the equalization then pre-cursors and the distance away from the cursor may impact the contribution to equalization (e.g., further the tap is away from the cursor the less the contribution). For example, the digital linear equalized signal may be based up to 100% on the cursor $D_0$ (if 100% equalization is off), up to 50% on the first post-cursor $D_1$, and up to 25% on the second post-cursor $D_2$ and first pre-cursor $D_{-1}$. The sum of all the taps should be 100%.

If consecutive digital signals being transmitted in the serial link are the same, the analog output signal (current bit amplitude) need not provide an absolute value representative of the digital signal. Rather, the analog output signal can begin to creep toward the value representative of the other digital signal to help the receiver on the other end of the link detect a transition in the data stream. That is, if a digital 0 was transmitted ($D_1$) and is to be transmitted again ($D_0$) the analog output signal need not have an absolute 0 value but can begin to creep toward a 1 value. Likewise, if a digital 1 was transmitted and is to be transmitted again the analog output signal need not have an absolute 1 value but can begin to creep toward a 0 value. Accordingly, in equalization the compliment of the pre and post cursor taps may be utilized to strengthen or weaken the analog output signal transmitted over the serial link. Depending on the platform utilized, the compliments may be utilized for only the first pre and post taps or may be utilized for additional taps.

Figure 2A:
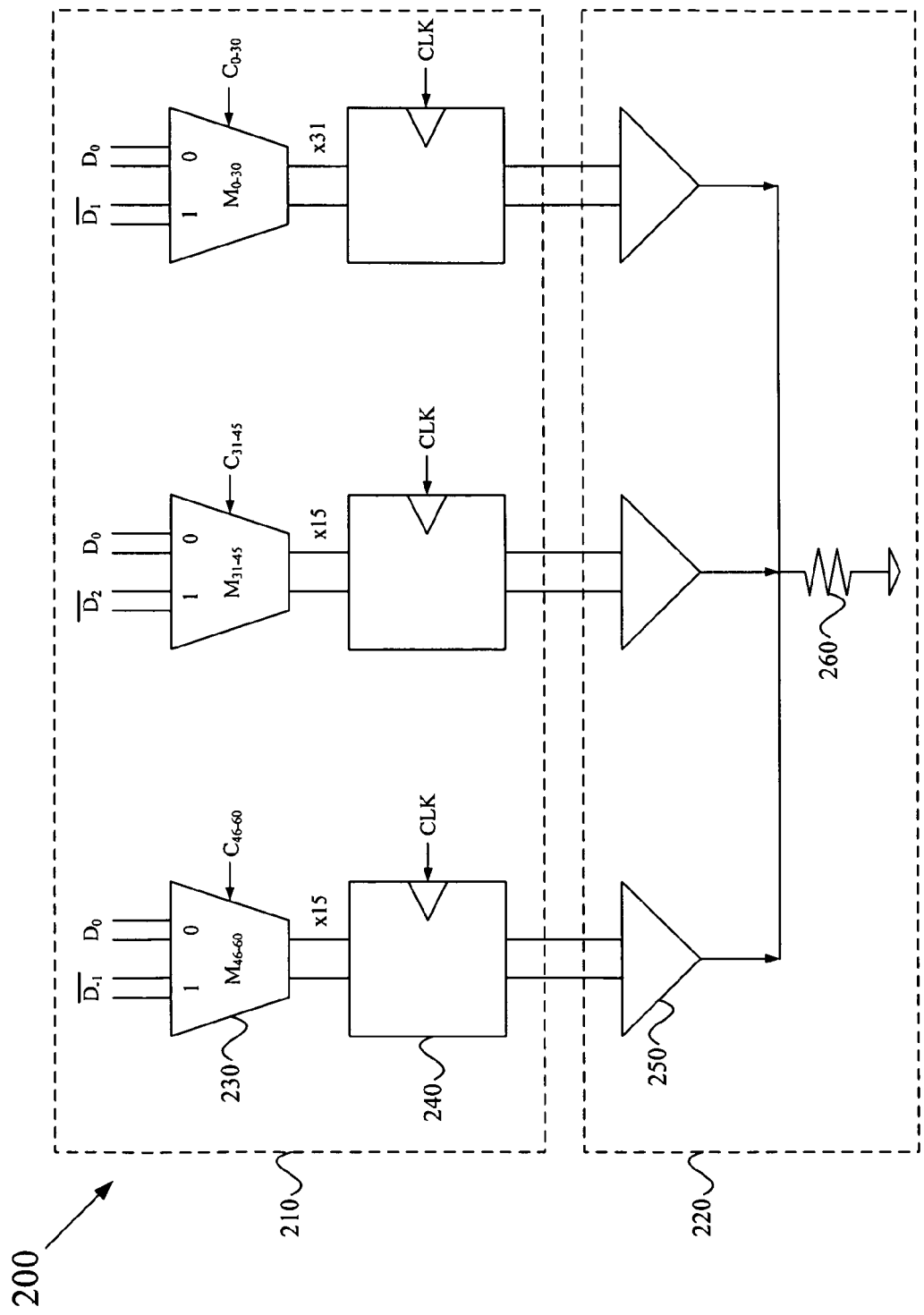
FIG. 2A illustrates an example functional diagram of a multiplexer based transmitter equalizer, according to one embodiment.

FIG. 2A illustrates an example functional diagram of a multiplexer based transmitter equalizer 200. The equalizer 200 may utilize four taps ($D_0$, $D_1$, $D_2$, $D_{-1}$). The equalizer 200 may include multiplexer based equalization 210 and analog current summation digital to analog converter (DAC) 220. The multiplexer based equalization 210 may include a plurality of multiplexers 230 and a plurality of flip-flops 240. The number of multiplexers 230 and flip-flops 240 may be based on the resolution of the equalization desired (e.g., 61 multiplexers 230 and flip-flops 240 may be utilized in one embodiment to provide a 1/61 (0.016) resolution).

Each multiplexer 230 may be provided with the cursor tap $D_0$ as one input and a complement of one of the other taps (1—tap or tapbar) as the second input (1-$D_{-1}$ or $D_{-1}$bar, 1-$D_2$ or $D_2$bar, 1-$D_1$ or $D_1$ bar). According to one embodiment (as illustrated), each multiplexer 230 may receive the cursor tap $D_0$ as the 0 select. The number of multiplexers 230 associated with each tap may be based on the equalization resolution (total number of multiplexers 230) and the possible equalization contribution (range) of each tap. The range for each tap may be based on the location of the tap with respect to the cursor. For example, according to one embodiment thirty-one multiplexers 230 (0-30) may be associated with the first post-cursor tap $D_1$ and have $D_1$bar as the second input, fifteen (or 30) multiplexers 230 (31-45) may be associated with the second post-cursor tap $D_2$ and fifteen (46-60) may be associated with the first pre-cursor tap $D_{-1}$ (only one of each illustrated).

Each of the multiplexers 230 may receive a coefficient to control which input (tap) is selected. For example, if the coefficient for a multiplexer 230 is 0 the multiplexer 230 may select $D_0$ and if the coefficient is 1 the multiplexer 230 may select the tapbar. According to one embodiment, coefficients $C_0$ through $C_{30}$ may control a respective one of the multiplexers 0-30 that propagate either $D_0$ or $D_1$bar to the output, coefficients $C_{31}$ through $C_{45}$ may control the multiplexers 31-45 that select either $D_0$ or $D_2$bar to the output, and coefficients $C_{46}$ through $C_{60}$ may select either $D_0$ or $D_{-1}$bar to propagate as the output for multiplexers 46-60.

According to one embodiment, by setting all coefficients to 0, the cursor tap $D_0$ may be propagated to the output of all the multiplexers 230 (equalization is turned off). By setting all coefficients to 1, the cursor tap $D_0$ may not be propagated to any of the outputs of the multiplexers 230. Accordingly, the cursor tap $D_0$ may have a range from 0 to 1 at increments according to one embodiment of 1/61 (0.016). The tap $D_1$bar may have a range from 0 if all the coefficients $C_0 C_{30}$ are 0 to 31/61 (0.508) if all the coefficients $C_0$-$C_{30}$ are 1. The taps $D_2$bar and $D_{-1}$bar may have a range from 0 if all the coefficients $C_{31}$-$C_{45}$ and $C_{46}$-$C_{60}$ respectively are 0 to 15/61 (0.246) if all the coefficients $C_{31}$-$C_{45}$ and $C_{46}$-$C_{60}$ respectively are 1.

The equalization parameters may be set with control bits. For example, 13 control bits may be used, 5 control bits to select the value for tap $D_1$bar (how many of the multiplexers 0-30 should select tap D bar) and 4 control bits to select the value for taps $D_2$bar and $D_{-1}$bar respectively. Decoders (not illustrated) may be used to generate the 61 ($C_0$ through $C_{60}$) coefficients. A 5-to-31 decoder may be used to convert the 5 $D_1$bar control bits into the $C_0$-$C_{30}$ coefficients and the two 4-to-15 decoders may be used to convert the 4 $D_2$bar and the 4 $D_{-1}$bar control bits into the $C_{31}$-$C_{45}$ and $C_{46}$-$C_{60}$ coefficients respectively.

The output of each of the multiplexers 230 may be provided to corresponding flip-flops 240. The flip flops 240 may utilize the clock to read the data in and out so that all of the data (tap values) output from the multiplexers 230 are aligned. The outputs of the flip flops 240 may be provided to the analog current summation DAC 220.

The analog current summation DAC 220 includes a plurality of DACs 250 aligned with corresponding flip flops 240. The DACs 250 convert the digital signal received into an analog signal. All the DACs 250 are tied together and to ground through a load resister 260 to sum all the individual analog signals and generate the overall analog signal.

The equalization may be defined as $((D_0\text{coeff}*D_0)+(D_1\text{coeff}*D_1\text{bar})+(D_2\text{coeff}*D_2\text{bar})+(D_{-1}\text{coeff}*D_{-1}\text{bar}))/\text{TOTcoeff}$, where $D_x\text{coeff}$ is the number of coefficients selected for the X tap, $D_0$ is the value of the cursor $D_0$, $D_x$bar is the inverted value of $D_x$ ($1-D_x$) for the X tap, and TOTcoef is the total number of coefficients. The equation shows that if the value of the post and pre cursors are the same as the cursor that they will actually shift the result away from the cursor value.

FIG. 2B illustrates example results for various data patterns for an implementation of the equalizer 200 where $D_1\text{coeff}=16$, $D_2\text{coeff}=4$, $D_{-1}\text{coeff}=4$ and $D_0\text{coeff}=37$(TOTcoeff–$D_1$coeff–$D_2$coeff–$D_{-1}$coeff). As can be seen when the pre or post cursors are the same as the cursor the resulting DAC value shifts away from the cursor value. For example, when the data pattern is 0000 the resulting DAC value is 0.393. The DAC value is the full cursor value when the cursor value is different than all the pre and post cursor values. For example, when the data pattern is 0100 the resulting DAC value is 1.

According to one embodiment, the example four tap equalizer 200 may also function as a 2 or 3-tap equalizer by selecting $D_0$ on all the multiplexers associated with the specific tap or taps. For example, to operate the four tap equalizer 200 as a three tap equalizer ($D_0$, $D_1$, $D_2$) all the multiplexers 46-60 may select tap $D_0$ as the output (no $D_{-1}$ selected) by setting all the $C_{46}$-$C_{60}$ coefficients as zeros. To operate as a three tap equalizer ($D_0$, $D_1$, $D_{-1}$) all the multiplexers 31-45 may select tap $D_0$ as the output (no $D_2$ selected) by having the $C_{31}$-$C_{45}$ coefficients all zeros. To operate the four tap equalizer 200 as a two tap equalizer ($D_0$, $D_1$) all the multiplexers 31-60 may select tap $D_0$ as the output (no $D_2$ or $D_{-1}$ selected) by setting all the $C_{31}$-$C_{60}$ coefficients as zeros. As previously noted equalization may be turned off by setting all the $C_0$-$C_{60}$ coefficients to zeros and therefore selecting tap $D_0$ (the cursor) as the output of all the multiplexers 230.

The example equalizer 200 illustrated four taps, 1/61 resolution, a range of 0 to 31/61 for first post-cursor tap, and a range of 0 to 15/31 for the second post-cursor tap $D_2$ and the first pre-cursor tap $D_{-1}$. The multiplexer based transmitter equalizer is not intended to be limited by these illustrated examples. Rather, a multiplexer based transmitter equalizer can easily be adapted to different number of taps, tap resolutions and tap ranges without departing from the scope.

The example equalizer 200 is illustrated as using differential multiplexers 230 (receiving differential signals and outputting differential signals) but is not limited thereto. Rather, the equalizer 200 may include a separate multiplexer 230 for each end of the differential signal. The output of the multiplexers 230 for each end of the differential signal may be provided to an appropriate flip flop 240.

The example equalizer 200 is illustrated as receiving differential signals but is not limited thereto. Rather, the equalizer 200 could receive a single ended signal for each tap without departing from the scope. The multiplexers 230 could receive a single ended signal for each tap and output the single ended signal selected (or have only a single multiplexer rather that one for each leg of the differential signal). The output could then be split and one of the signals could be inverted in order to provide the flip flops 240 with a differential signal. Providing the flip flops with a differential signal enables the flip flop to control the timing of the equalization.

The example equalizer 200 is illustrated as having the multiplexers 230 receive tapbar signals for the first and second post cursors and the pre cursor but is not limited thereto. For example, depending on the platform that equalization is being performed on the $2^{nd}$ post cursor tap may want to push the DAC value closer to the cursor value if the values are the same and away from the cursor if the values are different (opposite of that described above). Accordingly, the second post cursor value provided to the multiplexers 230 associated therewith (31-45) may vary depending on the platform (is platform dependent). According to one embodiment, $D_2$bar may be calculated and $D_2$ and $D_2$bar may be provided to a pre-equalization multiplexer (not illustrated) and the output of the pre-equalization multiplexer may be provided to the appropriate equalization multiplexers 230. The selection of $D_2$ or $D_2$bar may be made with a control bit that is set depending on platform.

Figure 3:
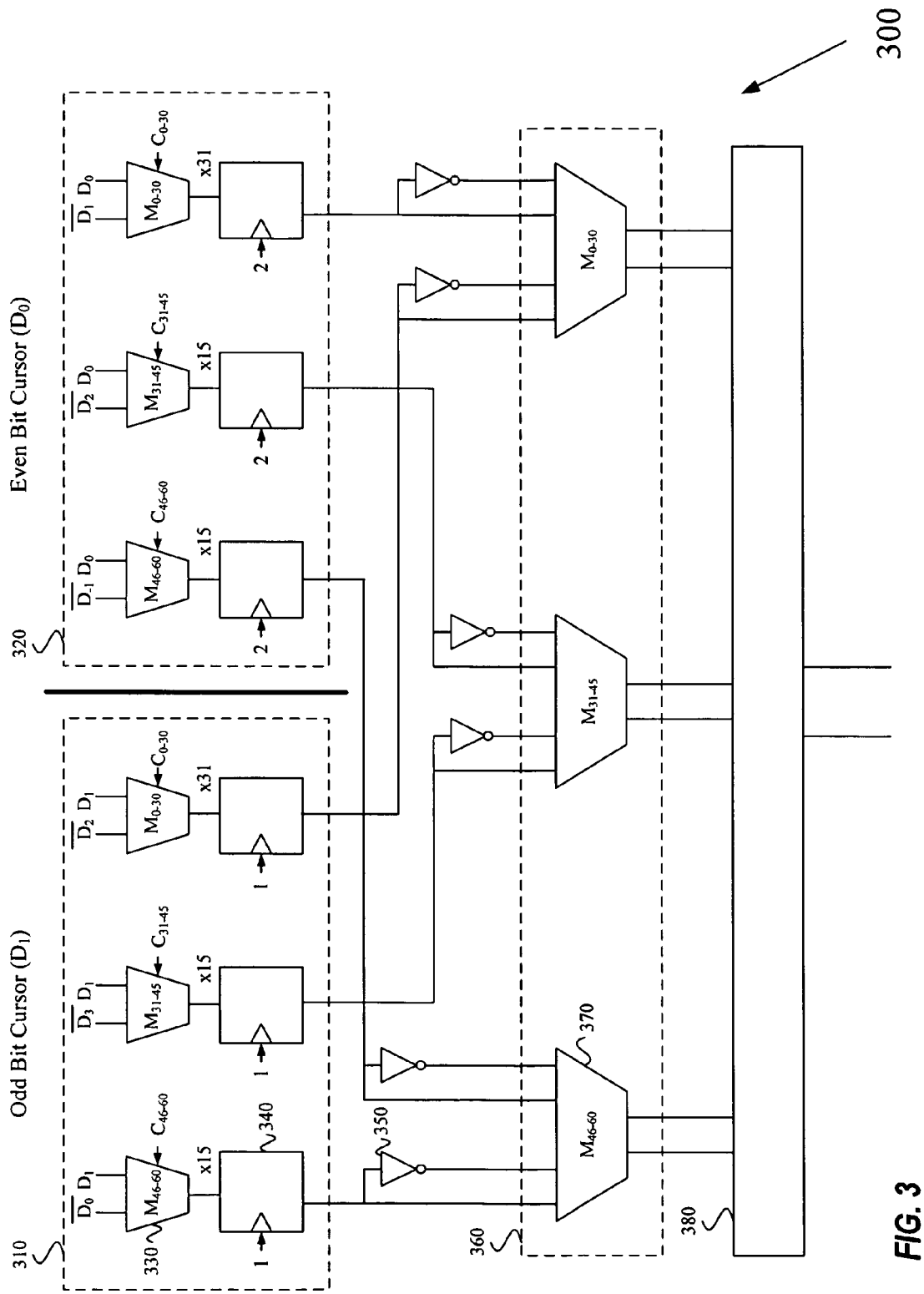
FIG. 3 illustrates an example functional diagram of a multiplexer based transmitter equalizer adapted to a two-way interleaved data stream, according to one embodiment.

FIG. 3 illustrates an example functional diagram of a multiplexer based transmitter equalizer 300 adapted to a two-way interleaved data stream. A two-way interleaved data stream is sometimes preferred in order to reduce the speed requirements of digital circuits. The cursor position for odd bits may be considered as $D_1$ while the cursor position for the even bits may be considered $D_0$. The equalizer 300 may include a multiplexer based equalization 310 for the odd bits and a multiplexer based equalization 320 for the even bits. The equalizer 300 may be a four tap implementation. The taps for the multiplexer based equalization 310 may be $D_0$, $D_1$, $D_2$, $D_3$ while the taps for the multiplexer based equalization 320 may be $D_{-1}$, $D_0$, $D_1$, $D_2$.

Each multiplexer based equalization 310, 320 may include a plurality of multiplexers 330 and a plurality of flip flops 340. The number of multiplexers 330 and flip-flops 340 may be based on the resolution of the equalization desired (e.g., 61 multiplexers 330 and flip-flops 340 may be utilized for each equalization 310, 320 in one embodiment to provide a 1/61 (0.016) resolution). The number of multiplexers 330 associated with each tap may be based on the equalization resolution (total number of multiplexers 330) and the possible equalization contribution (range) of each tap. The range for each tap may be based on the location of the tap with respect to the cursor.

For example, according to one embodiment the multiplexer based equalization 310 may include 31 multiplexers 330 (0-30) associated with $D_2$ and receiving taps $D_1$ and $D_2$bar, 15 multiplexers 330 (31-45) associated with $D_3$ and receiving taps $D_1$ and $D_3$bar, and 15 multiplexers 330 (46-60) associated with $D_0$ and receiving taps $D_1$ and $D_0$bar. The multiplexer based equalization 320 may include 31 multiplexers 330 (0-30) associated with $D_1$ and receiving taps $D_0$ and $D_1$bar, 15 multiplexers 330 (31-45) associated with $D_2$ and receiving taps $D_0$ and $D_2$bar, and 15 multiplexers 330 (46-60) associated with $D_{-1}$ and receiving taps $D_0$ and $D_{-1}$bar. The taps provided to the equalizer 300 may be generated from a 1 bit wide even and odd data streams by a preceding block (not illustrated) that delays data so that the four data taps for the even bit are available synchronously with an even phase clock and the four data taps for the odd bit are available synchronously with an odd phase clock.

Each of the multiplexers 330 may receive a coefficient to control which input (tap) is selected. For example, coefficients $C_0$-$C_{30}$, $C_{31}$-$C_{45}$ and $C_{46}$-$C_{60}$ may control the output of the multiplexers 0-30, 31-45 and 46-60 respectively for both multiplexer based equalizations 310, 320. A coefficient of 0 may select the cursor tap for the respective multiplexer 330 while a coefficient of 1 may select the other input of the multiplexer 330. For example, for multiplexers 0-30 a coefficient of 0 may select $D_1$ as the output of the multiplexers 330 in multiplexer based equalizations 310 and $D_0$ as the output of the multiplexer 330 in the multiplexer based equalizations 320 while a coefficient of 1 may select $D_2$bar as the output of the multiplexers 330 in multiplexer based equalizations 310 and $D_1$bar as the output of the multiplexer 330 in the multiplexer based equalizations 320.

The output of the multiplexers 330 may be provided to the flip flops 340. The flip flops 340 from the multiplexer based equalizations 310 may operate on a first clock signal (e.g., rising edge of a clock signal) and the flip flops 340 from the multiplexer based equalization 320 may operate on a second clock signal (e.g., falling edge of a clock signal). The output of the flip flops 340 may be split and then one of the signals may be inverted by inverter 350 to provide a differential signal and the differential signal may be provided to a 2 to 1 multiplexer 360 (e.g., a 61 segment 2 to 1 multiplexer according to one embodiment having 61 multiplexers 330 and flip flops 340 for the odd/even equalizations 310, 320). The multiplexer 360 includes a plurality of multiplexers 370 (only 3 are illustrated) that may receive the output of the corresponding flip flops 340 from the multiplexer based equalizations 310, 320. For example, multiplexer 0 370 may receive the differential signal from flip flop 0 340 for both the odd and even multiplexer based equalizations 310, 320.

The multiplexers 370 may multiplex the odd and even differential data streams into a final differential data output stream that flows at twice the speed of the odd and even data streams (e.g., 61 bit wide stream according to one embodiment). The select signal for the multiplexers 370 may basically be a half rate clock. The output of the multiplexer 360 may be a full-rate differential data stream (e.g., 61 bit differential data stream). The full-rate differential data stream may be provided to a pre-driver/driver 380 that converts the full-rate differential data stream into a single analog differential signal. The pre-driver/driver 380 may provide final analog current summation as the current driven into the load resistor (not illustrated) is the summing of the currents from the plurality of segments (e.g., 61).

The example equalizer 300 utilized four taps, $\frac{1}{61}$ resolution, a range of 0 to $\frac{31}{61}$ for first post-cursor tap, and a range of 0 to $\frac{15}{31}$ for the second post-cursor tap and the first pre-cursor tap. The multiplexer based transmitter equalizer is not intended to be limited by these illustrated examples. Rather, this multiplexer based transmitter equalizer can easily be adapted to different number of taps, tap resolutions and tap ranges.

The example equalizer 300 is illustrated as receiving single ended signals and converting the signals to differential signals after the flip-flops 340 (since the multiplexer 360 controls the timing) but is not limited thereto. Rather, the single ended signals could be converted to differential signals at other locations without departing from the scope. Furthermore, the equalizer 300 is not limited to providing equalization for single ended signals. Rather, the equalizer 300 could receive differential signals for each tap without departing from the scope.

The multiplexer based transmitter equalizers 200, 300 may take advantage of realistic tap coefficient ranges to reduce the implementation complexity for digital equalization. The multiplexer based transmitter equalizers 200, 300 may retain the ability to be configured from 0 to the maximum number of taps for a given implementation. The multiplexer based transmitter equalizers 200, 300 may be implemented into a transmitter simply as implementation may only requires the addition of multiplexer elements to the transmitter. In addition, the entire equalization may be done in one stage so that the latency added by the equalizers is minimal. The simple implementation may enable equalization to be performed with low power requirements. The equalizers 200, 300 may be utilized in high speed serial input/output (I/O) application to optimize performance without heavy power consumption.

Figure 4:
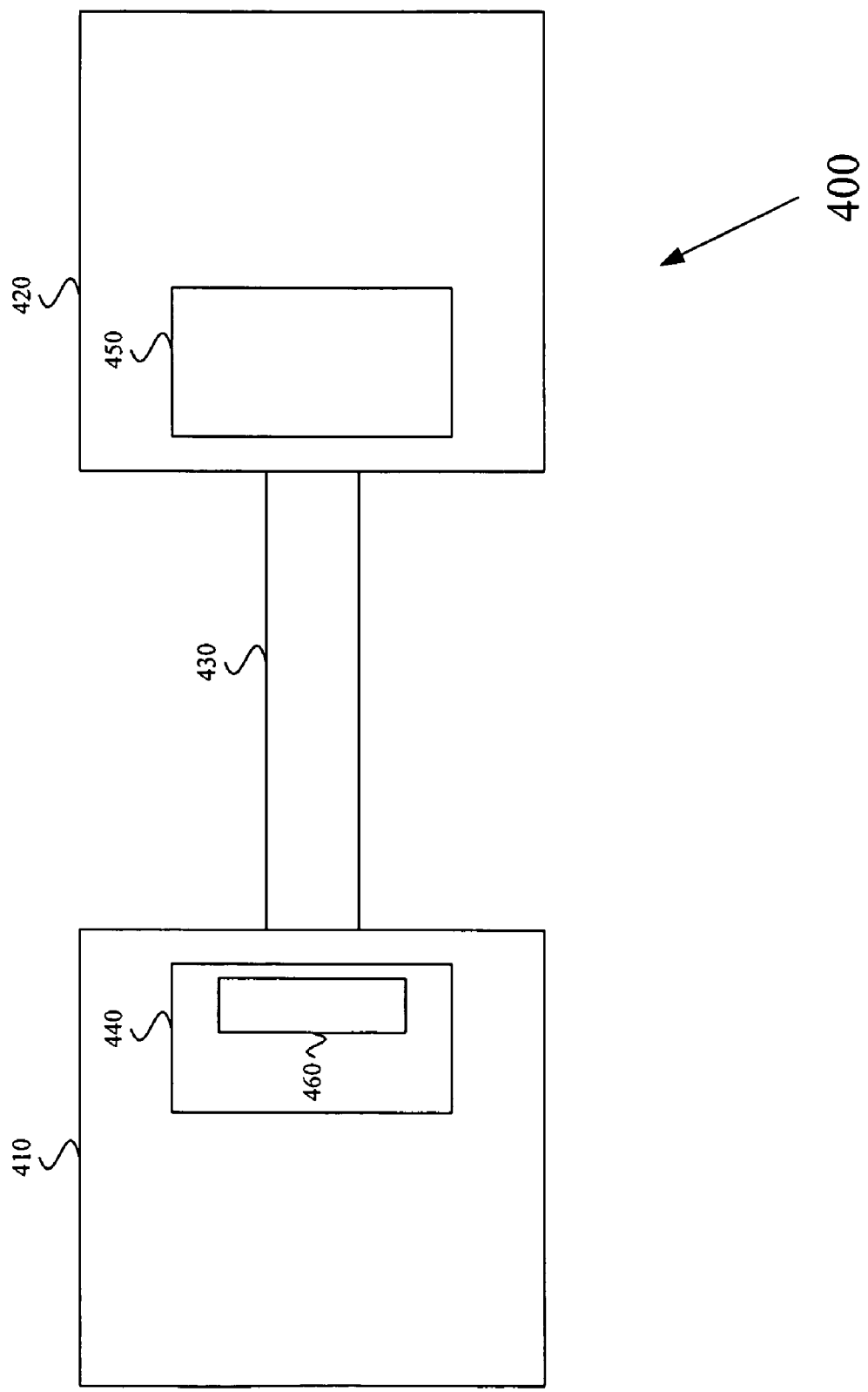
FIG. 4 illustrates an example computer system utilizing multiplexer based transmitter equalization, according to one embodiment.

FIG. 4 illustrates an example computer system 400 utilizing multiplexer based transmitter equalization. The system includes a processor circuit 410 and a chipset circuit 420 connected with a serial I/O link 430. The processor circuit 410 includes a transmitter 440 and the chipset circuit includes a receiver 450. The transmitter 440 includes a multiplexer based equalizer 460 therewithin.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A digital signal equalizer comprising
a plurality of multiplexers to define resolution of equalization, wherein the plurality of multiplexers are configured in a plurality of groups associated with a plurality of taps to be utilized for the equalization, wherein each group of the plurality of groups is associated with a non-cursor tap, wherein a number of multiplexers from the plurality of multiplexers associated with each group is based on equalization range for the group, wherein each multiplexer in a particular group selects a digital value associated with either a cursor tap or the associated non-cursor tap, and wherein the equalization can be turned off by selecting the digital value associated with the cursor tap for each multiplexer.

2. The equalizer of claim 1, wherein the multiplexers select the appropriate digital value based on the equalization desired.

3. The equalizer of claim 2, wherein the multiplexers receive coefficients based on the desired equalization and the coefficients are used to select the appropriate digital value.

4. The equalizer of claim 1, wherein the digital value associated with the non-cursor tap is a complement of a non-cursor tap digital signal.

5. The equalizer of claim 1, wherein the digital value associated with the non-cursor tap is selected as a complement of a non-cursor tap digital signal or the non-cursor tap digital signal, where the selection is platform dependent.

6. The equalizer of claim 1, where a number of taps from the plurality of taps to be utilized for the equalization can be reduced by selecting the digital value associated with the cursor tap for each multiplexer in a particular group of the plurality of groups associated with a tap to be excluded from the equalization.

7. The equalizer of claim 1, further comprising a plurality of flip flops aligned with the plurality of multiplexers, wherein the plurality of flip flops are to align the plurality of selected digital values.

8. The equalizer of claim 7, further comprising a digital to analog converter (DAC) to convert the plurality of selected digital values into a single analog signal.

9. The equalizer of claim 1, wherein the plurality of multiplexers includes a first set associated with an odd half of a two way interleaved data stream and a second set associated with an even set, wherein the first set and the second set have corresponding group configurations, and further comprising a 2-to-1 multiplexer to combine the corresponding digital values selected from the first set and the second set.

10. A digital signal equalizer comprising
an odd bit multiplexer based equalization including a first plurality of multiplexers arranged in a first plurality of groups, wherein each group of the first plurality of groups is associated with a non-cursor tap, wherein each multiplexer in a particular group selects either an odd cursor or the associated non-cursor tap based on equalization parameters defined, wherein a number of multiplexers in the first plurality of multiplexers defines resolution of equalization, wherein a number of groups in the first plurality of groups is based on a number of taps, and wherein a number of multiplexers associated with each group is based on how far the associated non-cursor tap is away from the odd cursor;
an even bit multiplexer based equalization including a second plurality of multiplexers arranged in a second plurality of groups, wherein each group of the second plurality of groups is associated with a non-cursor tap, wherein each multiplexer in a particular group selects either an even cursor or the associated non-cursor tap based on the equalization parameters defined, wherein a number of multiplexers in the second plurality of multiplexers is same as the number of multiplexers in the first plurality of multiplexers, and wherein a number of groups in the second plurality of groups is same as the number of groups in the first plurality of groups; and
a 2-to-1 multiplexer to combine associated outputs from the odd bit multiplexer based equalization and the even bit multiplexer based equalization.

11. The equalizer of claim 10, wherein the odd bit multiplexer based equalization further includes a first plurality of flip flops equal in number to the number of multiplexers in the first plurality of multiplexers to clock an output of an associated multiplexer according to a first clock signal, and wherein the even bit multiplexer based equalization further includes a second plurality of flip flops equal in number to the number of multiplexers in the second plurality of multiplexers to clock an output of an associated multiplexer according to a second clock signal.

12. The equalizer of claim 11, wherein the odd bit multiplexer based equalization further includes a first plurality of inverters equal in number to the number of flip flops in the first plurality of flip flops to generate an inverted output, and wherein the even bit multiplexer based equalization further includes a second plurality of inverters equal in number to the number of flip flops in the second plurality of flip flops to generate an inverted output, wherein the 2-to-1 multiplexer is to combine the associated outputs and the inverted outputs from the odd bit multiplexer based equalization and the even bit multiplexer based equalization.

13. The equalizer of claim 10, further comprising a pre-driver /driver to convert an output of the 2-to-1 multiplexer into an analog signal.

14. The equalizer of claim 10, wherein
the number of taps considered in equalization can be reduced by selecting the odd cursor for each multiplexer in a particular group of the first plurality of groups associated with a tap to be excluded from equalization and selecting the even cursor for each multiplexer in a particular group of the second plurality of groups associated with the tap to be excluded from equalization; and
equalization can be turned off by selecting the odd cursor for all of the multiplexers in the first plurality of multiplexers and the even cursor for all of the multiplexers in the second plurality of multiplexers.

15. A system comprising
a first processor having a transmitter to transmit data, wherein the transmitter includes a multiplexer based equalizer that includes a plurality of multiplexers to define resolution of equalization, wherein the plurality of multiplexers are configured in a plurality of groups associated with a plurality of taps to be utilized for the equalization, wherein each group of the plurality of groups is associated with a non-cursor tap, wherein a number of multiplexers from the plurality of multiplexers associated with each group is based on equalization range for the group, wherein each multiplexer in a particular group selects a digital value associated with either a cursor tap or the associated non-cursor tap, and wherein a number of taps from the plurality of taps to be utilized for the equalization can be reduced by selecting the digital value associated with the cursor tap for each multiplexer in a particular group of the plurality of groups associated with a tap to be excluded from the equalization;
a second processor having a receiver to receive data; and
a data link between the first and the second processor.

16. The system of claim 15, wherein the equalization can be turned off by selecting the digital value associated with the cursor tap for each multiplexer.

17. The system of claim 15, further comprising a plurality of flip flops aligned with the plurality of multiplexers, wherein the plurality of flip flops are to align the plurality of selected digital values.

18. The system of claim 17, further comprising a digital to analog converter (DAC) to convert the plurality of selected digital values into a single analog signal.

* * * * *